United States Patent
Dimpflmaier et al.

(10) Patent No.: US 10,003,366 B2
(45) Date of Patent: Jun. 19, 2018

(54) LOW-POWER RECEIVING USING A SCOUTING MODE

(71) Applicant: Apple Inc., Cupertino, CA (US)

(72) Inventors: Ronald W. Dimpflmaier, Los Gatos, CA (US); Matthias Sauer, San Jose, CA (US); Bernd W. Adler, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days. days.

(21) Appl. No.: 15/241,802

(22) Filed: Aug. 19, 2016

(65) Prior Publication Data

US 2017/0346514 A1 Nov. 30, 2017

Related U.S. Application Data

(60) Provisional application No. 62/342,091, filed on May 26, 2016.

(51) Int. Cl.
| | | |
|---|---|---|
| *H04W 72/02* | (2009.01) | |
| *H04B 1/10* | (2006.01) | |
| *H04W 52/02* | (2009.01) | |
| *H04K 3/00* | (2006.01) | |
| *H04B 1/18* | (2006.01) | |

(52) U.S. Cl.
CPC .............. *H04B 1/1027* (2013.01); *H04B 1/18* (2013.01); *H04K 3/226* (2013.01); *H04K 2203/16* (2013.01); *H04K 2203/18* (2013.01)

(58) Field of Classification Search
CPC .......... H04B 1/10; H04B 1/1027; H04B 1/18; H04K 3/20; H04K 3/22; H04K 3/226; H04W 72/02; H04W 52/02; H04W 52/0209

See application file for complete search history.

(56) References Cited

U.S. PATENT DOCUMENTS

| | | | | |
|---|---|---|---|---|
| 7,864,051 | B2 | 1/2011 | Paradiso et al. | |
| 8,416,897 | B2 | 4/2013 | Lee et al. | |
| 9,544,848 | B2* | 1/2017 | Jafarian | H04W 52/0229 |
| 2009/0213764 | A1* | 8/2009 | Chiu | H04B 1/525 370/277 |
| 2012/0250537 | A1* | 10/2012 | Shatil | H04W 52/0216 370/252 |
| 2014/0112224 | A1* | 4/2014 | Jafarian | H04W 52/0209 370/311 |
| 2014/0126442 | A1* | 5/2014 | Jafarian | H04W 52/0212 370/311 |

(Continued)

FOREIGN PATENT DOCUMENTS

| | | | | |
|---|---|---|---|---|
| EP | 2453582 A1 * | 5/2012 | | H04B 1/7097 |
| EP | 2912894 A | 9/2015 | | |
| WO | 2102138798 A1 | 10/2012 | | |

*Primary Examiner* — Blane Jackson
(74) *Attorney, Agent, or Firm* — Fletcher Yoder PC

(57) ABSTRACT

A low-power scouting receiver is presented that provides an ability perform low-power scouting functions at a relatively low power. The low-power scouting functions determine context information for the receiver and enable fine-tuning of other receiver operations based on the context information. The low-power scouting functions include receiver control and switching, jammer detection, self-interference detection, or other context-dependent radio parameters.

13 Claims, 9 Drawing Sheets

(56) References Cited

U.S. PATENT DOCUMENTS

| | | | |
|---|---|---|---|
| 2014/0269991 A1* | 9/2014 | Aparin | H04B 1/0475 375/297 |
| 2015/0071150 A1* | 3/2015 | Bradley | H04W 52/0216 370/311 |
| 2015/0358041 A1* | 12/2015 | Li | H04B 1/1036 455/188.1 |
| 2016/0065251 A1* | 3/2016 | Yoo | H04B 1/0475 455/114.3 |
| 2017/0111164 A1* | 4/2017 | Wyville | H04B 1/525 |

* cited by examiner

LOW-POWER RECEIVING USING A SCOUTING MODE

CROSS-REFERENCE TO RELATED APPLICATIONS

This application claims the benefit of Provisional Application Ser. No. 62/342,091, filed May 26, 2016, entitled "Low-Power Receiver," which is incorporated by reference herein in its entirety.

BACKGROUND

The present disclosure relates generally to techniques for scouting using a low-power receiver.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Wireless communication devices (e.g., smartphones, wearable devices, etc.) are proliferating. Many wireless communication devices support multiple communication protocols on the same platform. For example, wireless communication devices may use Long-Term Evolution (LTE), Wideband Code Division Multiple Access (WCDMA), wireless local area networks (WLAN), Bluetooth, Global Positioning System (GPS), Near-Field Communication (NFC), and/or other suitable wireless communication protocols. Moreover, incoming data may be received using a receiver that has significant power consumption even when no actual data is being received. As can be understood, power consumption is especially important for battery-powered devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosure teaches a wireless confirmation system that uses a relatively low-power scouting receiver. The low-power receiver may be relatively low-power compared to other receivers in the electronic device. For example, the low-power receiver may be used for the purpose of receiving control channel information, such as an LTE PDCCH (Physical Downlink Control Channel). The relatively low-power scouting receiver may determine radio context information around an electronic device that enables the electronic device to determine a mode of operation or parameters that are suitable for the specific context in which the electronic device is deployed. The radio context information includes information about wireless signals and/or noise around the electronic device. Various scouting operations may be performed based on the context information. For example, the context information may be used to determine when to use a higher-power receiver (e.g., higher fidelity) based on whether a control message indicates that a message is being sent on a radio of the electronic device. Furthermore, the context information may indicate whether jammers are detected, thereby causing the electronic device to set receive parameter(s) and signal conditioning appropriately. Moreover, the context information may be used to detect self-interference from other radios on the electronic device thereby causing the electronic device to cancel out such interference.

Additionally or alternatively, the low-power receiver may be used for various other scouting functions, such as ascertaining neighbor cell measurements, a current condition of the radio, and/or other radio context information. These scouting functions may help the electronic device set itself into a mode of operation specific to the radio context information around the electronic device, such as continual noise and/or wireless signal conditions.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
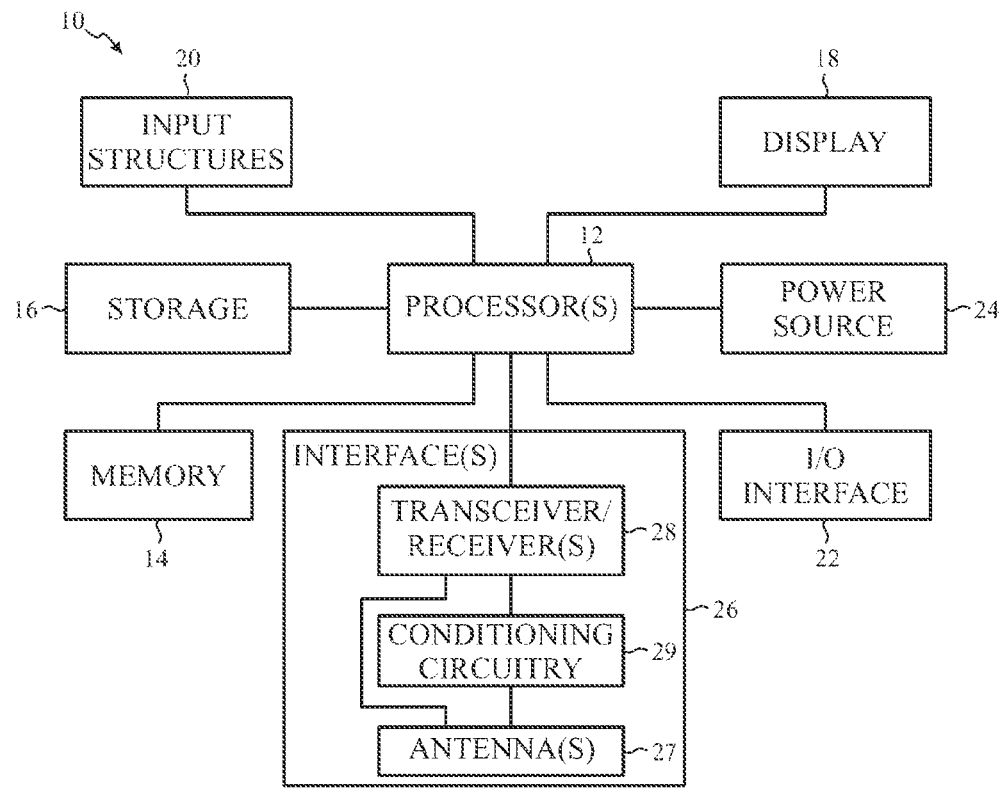
FIG. 1 is a schematic block diagram of an electronic device including wireless transceiver(s)/receiver(s), in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Around 1.76 billion people now own and use smartphones. By 2017, more than one-third of all people around the globe are expected to be smartphone users. High penetration of smart phones combined with wide availability of low cost microelectromechanical systems (MEMS) sensors have increased proliferation of smart devices (e.g., wearable devices) with a demand for power conservation in all smart devices with battery power.

Many smart devices, such as smartphones, wearable devices, tablets, and computers, support various communication protocols, such as LTE, WCDMA, WLAN, Bluetooth GPS, and NFC. However, many of these protocols use a receiver to receive and decode data that uses power to condition and/or receive the data even though part of the time no relevant signals are being received. Indeed, such periods may include a majority (e.g., 55%, 60%, 65%, 70%, or more) of the time that the receiver operates. Thus, power associated with the receiver may be wasted while no substantive messages are being actively received by the receiver. Instead, in some embodiments, the receiver may be disabled while a low-power receiver is used to scout whether substantive signals are to be received by the receiver. The low-power receiver may be relatively low-power compared to other receivers in the electronic device. For example, the low-power receiver may be used for the purpose of receiving control channel information, such as an LTE PDCCH (Physical Downlink Control Channel). Since control channel (e.g., PDCCH) reception is usually robust with low order modulation, such as Quadrature Phase Shift Keying (QPSK), and heavy error protection, demands of the control channel receiver are lower than substantive data. In addition, control channel reception and decoding is a receive only operation with no uplink signal present. Thus, the foregoing characteristics translate to significantly relaxed RF receiver requirements relative to reception of downlink traffic channels, such as an LTE PDSCH (Physical Downlink Shared Channel).

Consequently, the low-power receiver may be designed for much lower power consumption as compared to normal receiver paths that cope with a variety of radio frequency signal conditions including transmitter leakage for frequency division duplexing bands. Moreover, control channel reception and decoding is known to be responsible for a significant proportion of the overall power budget. It is therefore highly advantageous to reduce receiver power consumption for the control channel use case. In this way, a low-power scouting receiver will be beneficial in reducing overall power consumption, leading to longer battery life for the user. In some embodiments, the low-power scouting function may be performed using a receiver already present in the electronic device.

With the foregoing in mind and referring first to FIG. 1, an electronic device 10 according to an embodiment of the present disclosure may include, among other things, one or more processor(s) 12, memory 14, nonvolatile storage 16, a display 18, input structures 20, an input/output (I/O) interface 22, a power source 24, and interface(s) 26. The various functional blocks shown in FIG. 1 may include hardware elements (e.g., including circuitry), software elements (e.g., including computer code stored on a computer-readable medium) or a combination of both hardware and software elements. It should be noted that FIG. 1 is merely one example of a particular implementation and is intended to illustrate the types of components that may be present in electronic device 10.

In the electronic device 10 of FIG. 1, the processor(s) 12 and/or other data processing circuitry may be operably coupled with the memory 14 and the nonvolatile storage 16 to perform various algorithms. Such programs or instructions, including those for executing the techniques described herein, executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and/or optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (e.g., LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more light emitting diode (e.g., LED) displays, or some combination of LCD panels and LED panels.

The input structures 20 of the electronic device 10 may enable a user to interact with the electronic device 10 (e.g., pressing a button to increase or decrease a volume level). The I/O interface 22 may enable electronic device 10 to interface with various other electronic devices. The I/O interface 22 may include various types of ports that may be connected to cabling. These ports may include standardized and/or proprietary ports, such as USB, RS232, Apple's Lightning® connector, as well as one or more ports for a conducted RF link.

As further illustrated, the electronic device 10 may include a power source 24. The power source 24 may include any suitable source of power, such as a rechargeable lithium polymer (e.g., Li-poly) battery and/or an alternating current (e.g., AC) power converter. The power source 24 may be removable, such as a replaceable battery cell.

The interface(s) 26 enable the electronic device 10 to connect to one or more network types. The interface(s) 26 may also include, for example, interfaces for a personal area network (e.g., PAN), such as a Bluetooth network, for a local area network (e.g., LAN) or wireless local area network (e.g., WLAN), such as an 802.11x Wi-Fi network or an 802.15.4 network, and/or for a wide area network (e.g., WAN), such as a 3rd generation (e.g., 3G) cellular network, 4th generation (e.g., 4G) cellular network, or long term evolution (e.g., LTE) cellular network. The interface(s) 26 may also include interfaces for, for example, broadband fixed wireless access networks (e.g., WiMAX), mobile broadband Wireless networks (e.g., mobile WiMAX), and so forth. The interface(s) 26 include antenna(s) 27 that detect and/or transmit wireless signals around the electronic device 10 and passes the received signals to transceiver/receiver(s) 28. The transceiver/receiver(s) 28 may include one or more receivers and/or transmitters that are configured to send and/or receive information via one or more respective antennas of the antenna(s) 27. Each transceiver/receiver 28 may be connected to its own antenna 27. Alternatively, at least some of the transceiver/receiver(s) 28 may share an antenna 27.

Furthermore, some received signals may be conditioned (e.g., filtered, amplified, attenuated, etc.) for being received by the receivers 28 using conditioning circuitry 29. However, the conditioning circuitry 29 may consume energy while conditioning the signal to a state that is capable of being interpreted by the receiver 28 to derive data from the wireless signal. Furthermore, receivers 28 that are suitable to interpret some signals (e.g., LTE signals) may be relatively high-energy consumption receivers relative to other receivers (e.g., a feedback receiver). If a receiver 28 and/or relative conditioning circuitry is on, power is consumed regardless of whether the signal being received is an active signal containing data to be decoded and interpreted by the receiver 28. Indeed, in some cases, a receiver 28 may receive signals less than 5% of operating time. The remainder of operating time is with no active data being received, and the relatively high-power receiver of the receivers 28 wastes energy consumed in operation. Thus, in some embodiments, a relatively low-power receiver may be included in the receivers 28 to determine whether substantive data is being received while reducing an amount of energy consumed if using a relatively-high power receiver. In some embodiments, as illustrated, at least a portion of the conditioning circuitry 29 may be bypassed when the low-power scouting receiver is being used. Additionally or alternatively, a less-complex (e.g., lower power) receiver may be used to reduce power when no substantive data is detected. Moreover, the low-power receiver may be used to detect jammers and/or self-interference, as discussed below.

Figure 2:
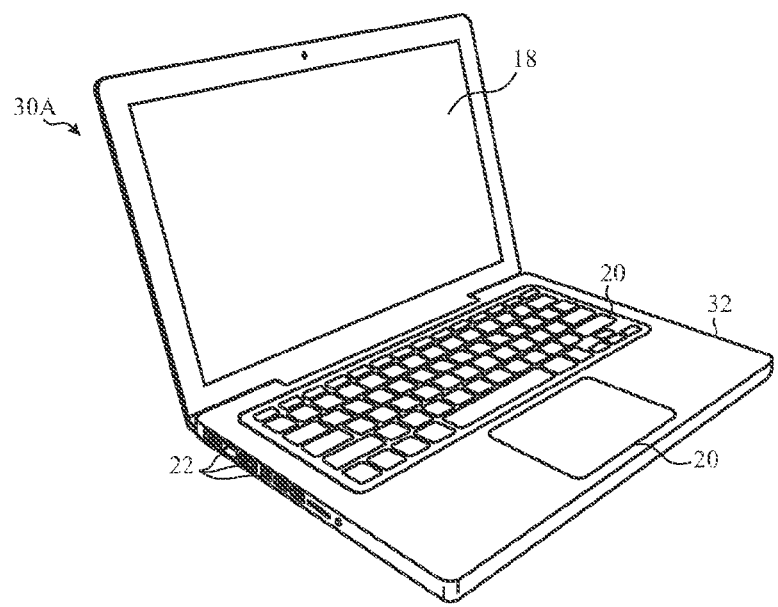
FIG. 2 is a perspective view of a notebook computer representing an embodiment of the electronic device of FIG. 1, in accordance with an embodiment.
Figure 3:
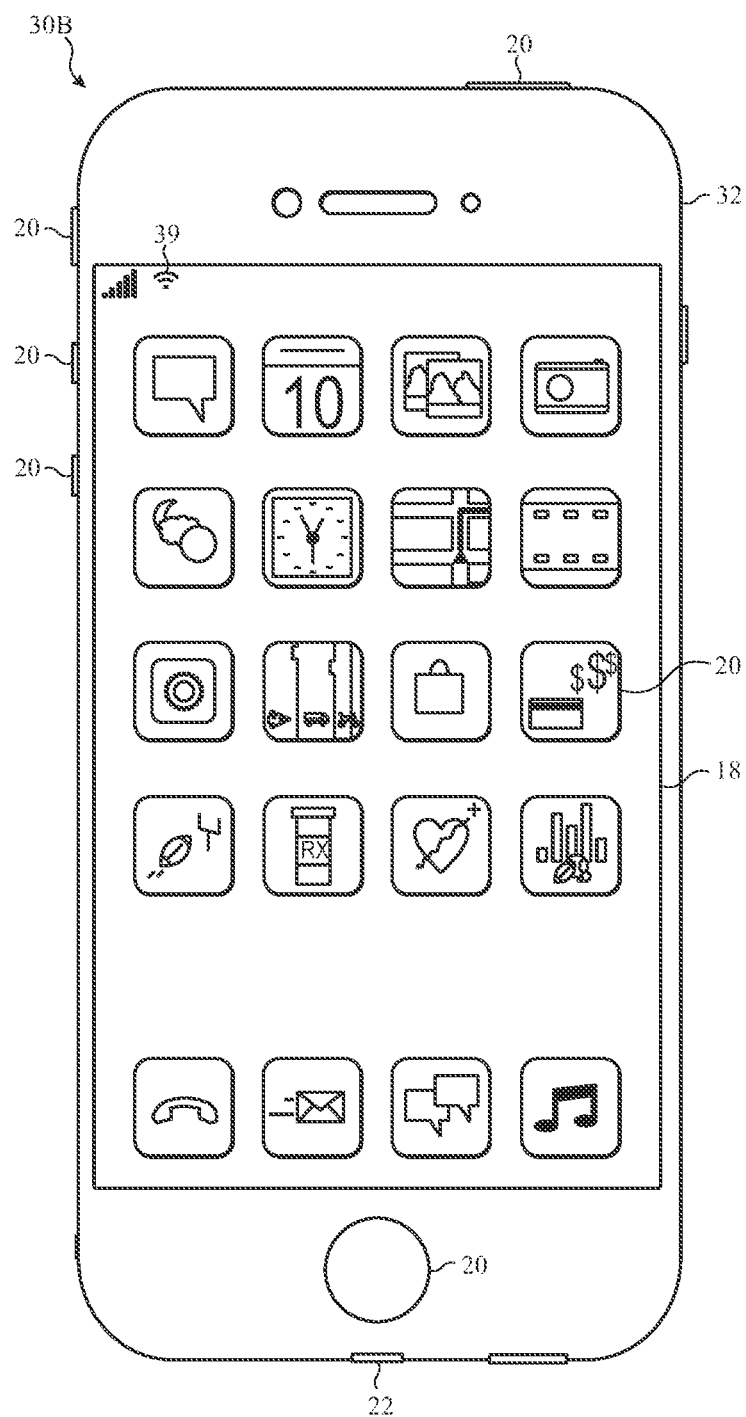
FIG. 3 is a front view of a hand-held device representing another embodiment of the electronic device of FIG. 1, in accordance with an embodiment.
Figure 4:
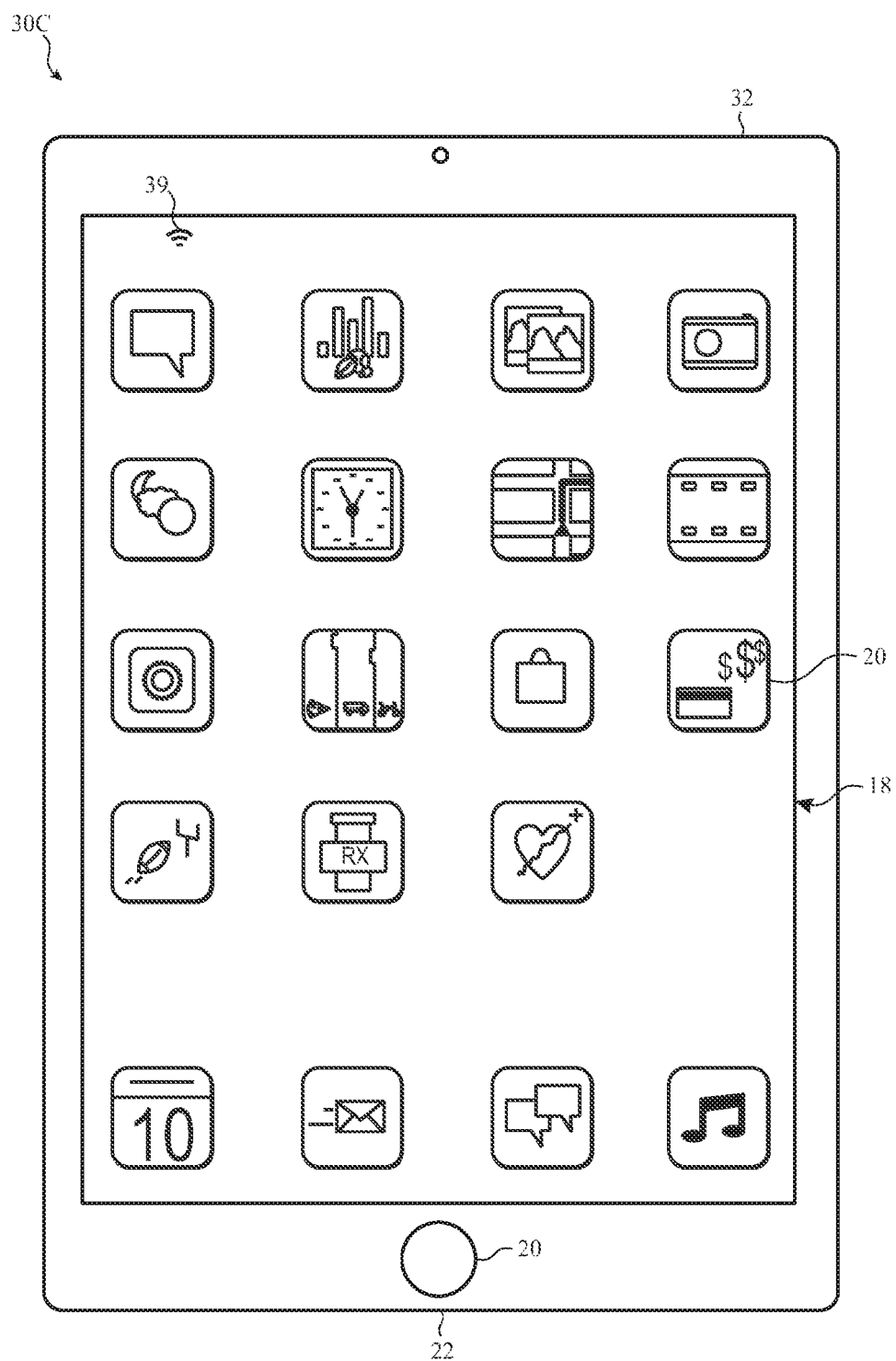
FIG. 4 is a front view of another hand-held device representing another embodiment of the electronic device of FIG. 1, in accordance with an embodiment.
Figure 5:
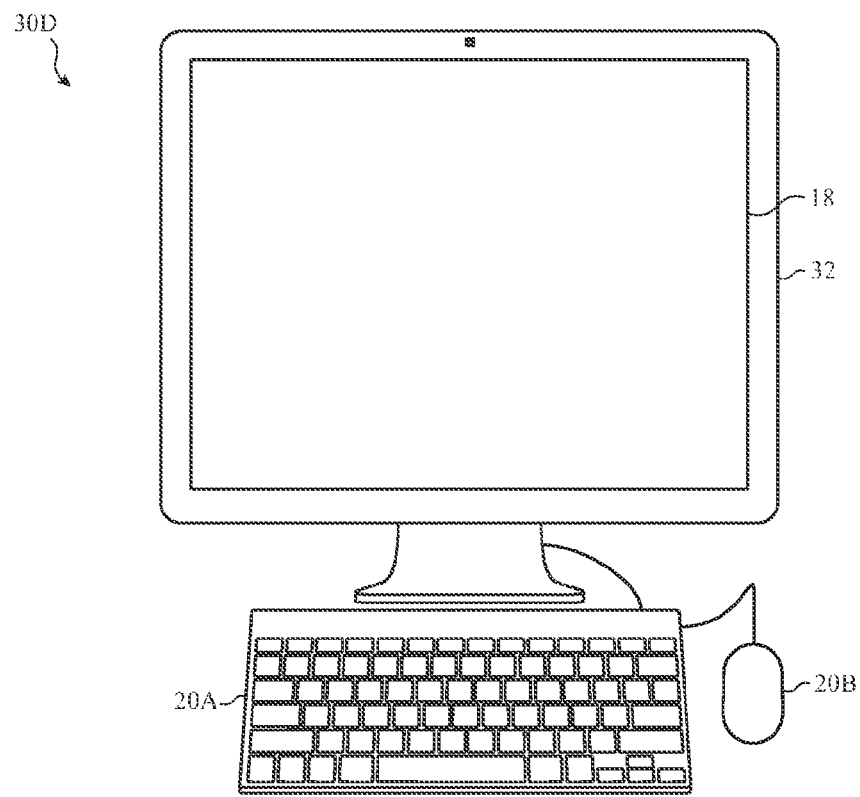
FIG. 5 is a front view of a desktop computer representing another embodiment of the electronic device of FIG. 1, in accordance with an embodiment.
Figure 6:
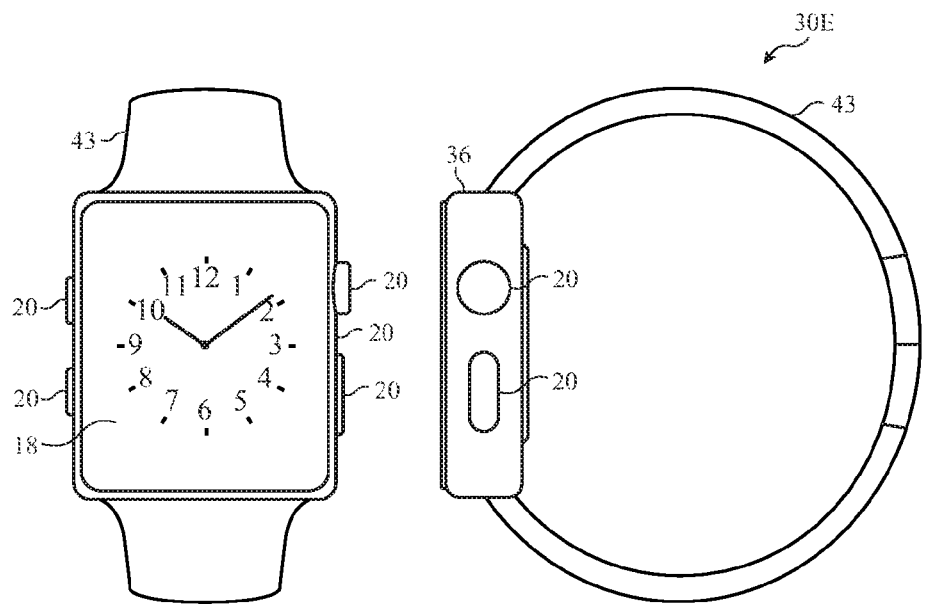
FIG. 6 is a front view of a wearable electronic device representing another embodiment of the electronic device of FIG. 1, in accordance with an embodiment.

By way of example, the electronic device 10 may represent a block diagram of the notebook computer depicted in FIG. 2, the handheld device depicted in either of FIG. 3 or FIG. 4, the desktop computer depicted in FIG. 5, the wearable electronic device depicted in FIG. 6, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In certain embodiments, the electronic device 10 may take the form of a computer, a portable electronic device, a wearable electronic device, or other type of electronic device. Such computers may include computers that are generally portable (e.g., such as laptop, notebook, and tablet computers) as well as computers that are generally used in one place (e.g., such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure.

The depicted computer 30A may include a housing or enclosure 32, a display 18, input structures 20, and ports of the I/O interface 22. In one embodiment, the input structures 20 (e.g., such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a model of an iPod® or iPhone® available from Apple Inc. of Cupertino, Calif.

The handheld device 30B may include an enclosure 32 to protect interior components from physical damage and to shield them from electromagnetic interference. The enclosure 32 may surround the display 18, which may display indicator icons 39. The indicator icons 39 may indicate, among other things, a cellular signal strength, Bluetooth connection, and/or battery life. The I/O interfaces 22 may open through the enclosure 32 and may include, for example, an I/O port for a hard wired connection for charging and/or content manipulation using a connector and protocol, such as the Lightning connector provided by Apple Inc., a universal serial bus (e.g., USB), one or more conducted RF connectors, or other connectors and protocols.

User input structures 20, in combination with the display 18, may allow a user to control the handheld device 30B. For example, one of the input structures 20 may activate or deactivate the handheld device 30B, one of the input structures 20 may navigate user interface to a home screen, a user-configurable application screen, and/or activate a voice-recognition feature of the handheld device 30B, while other of the input structures 20 may provide volume control, or may toggle between vibrate and ring modes. Additional input structures 20 may also include a microphone may obtain a user's voice for various voice-related features, and a speaker to allow for audio playback and/or certain phone capabilities. The input structures 20 may also include a headphone input (not illustrated) to provide a connection to external speakers and/or headphones and/or other output structures.

FIG. 4 depicts a front view of another handheld device 30C, which represents another embodiment of the electronic device 10. The handheld device 30C may represent, for example, a tablet computer, or one of various portable computing devices. By way of example, the handheld device 30C may be a tablet-sized embodiment of the electronic device 10, which may be, for example, a model of an iPad® available from Apple Inc. of Cupertino, Calif.

Turning to FIG. 5, a computer 30D may represent another embodiment of the electronic device 10 of FIG. 1. The computer 30D may be any computer, such as a desktop computer, a server, or a notebook computer, but may also be a standalone media player or video gaming machine. By way of example, the computer 30D may be an iMac®, a MacBook®, or other similar device by Apple Inc. It should be noted that the computer 30D may also represent a personal computer (e.g., PC) by another manufacturer. A similar enclosure 32 may be provided to protect and enclose internal components of the computer 30D such as the display 18. In certain embodiments, a user of the computer 30D may interact with the computer 30D using various peripheral input devices, such as the keyboard 20A or mouse 20B, which may connect to the computer 30D via an I/O interface 22.

Similarly, FIG. 6 depicts a wearable electronic device 30E representing another embodiment of the electronic device 10 of FIG. 1 that may be configured to operate using the techniques described herein. By way of example, the wearable electronic device 30E, which may include a wristband 43, may be an Apple Watch® by Apple, Inc. However, in other embodiments, the wearable electronic device 30E may include any wearable electronic device such as, for example, a wearable exercise monitoring device (e.g., pedometer, accelerometer, heart rate monitor), or other device by another manufacturer. The display 18 of the wearable electronic device 30E may include a touch screen (e.g., LCD, an organic light emitting diode display, an active-matrix organic light emitting diode (e.g., AMOLED) display, and so forth), which may allow users to interact with a user interface of the wearable electronic device 30E.

Figure 7:
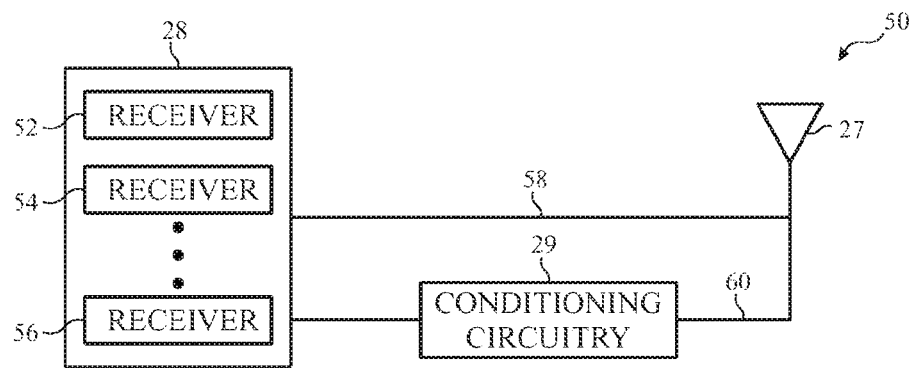
FIG. 7 is a schematic view of a receiver system that may employed in the electronic device of FIG. 1, in accordance with an embodiment.

FIG. 7 illustrates a receiver system 50 that may be used to operate the electronic device 10 to enhance power efficiency of the interface 26, specifically the receiver 28. The receiver system 50 includes antenna 27 and the receivers 28 as an antenna array including at least two receivers: receiver 52 and 54. In some embodiments, the receivers 28 may include more than two receivers, such as a third receiver 56 and/or additional receivers. In some embodiments, the first receiver 52 may be more complex than the second receiver 54 using more power to decode signals. In some cases, in exchange for the increased power consumption, the more complex first receiver 52 may provide additional functionality over the less complex second receiver 54, but with more constraints on signal quality and parameters than the second receiver 54. Furthermore, the low-power receiver may be used for scouting functions including control channel scanning, jammer detection, and/or self-interference detection. In some functions, the conditioning circuitry 29 may be bypassed. For example, if a scouting operation is currently enabled, the conditioning circuitry 29 may be bypassed using path 58, but if other operations, such data receipt or feedback detection, are used, a second path through the conditioning circuitry 29 may be used. It should be noted that the amount and type of conditioning circuitry 29 may vary depending on the function currently used. For example, some amplifiers may be used in the conditioning circuitry 29 for data receipt but bypassed during feedback detection in the conditioning circuitry 29 while some portions of the conditioning circuitry 29 (e.g., directional coupling, etc) are used for both functions.

I. Receiver Control

Figure 8:
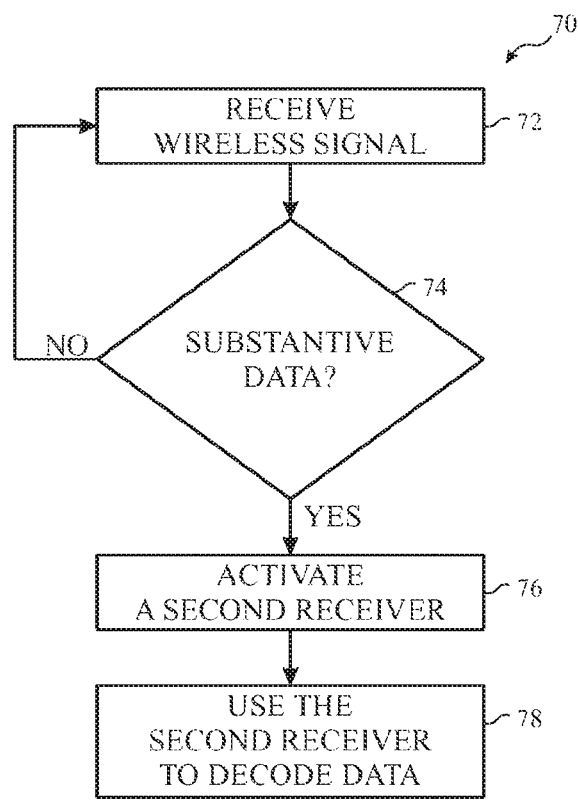
FIG. 8 illustrates a flow diagram of a process for receiver control using the receiver system of FIG. 7, according to an embodiment.

FIG. 8 illustrates a process 70 for operating the receiver system 50 as a scouting system. The process 70 includes receiving a wireless signal (block 72). For example, the wireless signal may be received at an antenna of the electronic device 10. The wireless signal may be received at a first receiver relatively unprocessed signals from the antenna. Furthermore, the first receiver may be a relatively low-power receiver relative to other receivers in the electronic device 10. Using the first receiver, determine whether the signal contains substantive data or indicates that substantive data is to be transmitted (block 74). For example, receiver logic may determine that the wireless signal corresponds to a control signal and/or that the wireless signal contains metadata that indicates a presence of substantive data in the wireless message or in subsequent messages.

If no substantive data is indicated in the wireless message, the electronic device 10 continues using the first receiver. However, if substantive data is present in the message, the electronic device uses a second receiver and activates the second receiver (block 76). The second receiver may be a more complex receiver than the first receiver. For example, the first receiver may be used for the purpose of receiving control channel information, such as an LTE PDCCH (Physical Downlink Control Channel) while the first channel is used for data receipt. Since control channel (e.g., PDCCH) reception is usually robust with low order modulation, such as Quadrature Phase Shift Keying (QPSK), and heavy error protection, demands of the control channel receiver are lower than substantive data on data receipt. In addition, control channel reception and decoding is a receive only operation with no uplink signal present. Thus, the foregoing characteristics translate to significantly relaxed RF receiver requirements relative to reception of downlink traffic channels, such as an LTE PDSCH (Physical Downlink Shared Channel).

Consequently, the low-power receiver may be designed for much lower power consumption as compared to normal receiver paths that cope with a variety of radio frequency signal conditions including transmitter leakage for frequency division duplexing bands. Moreover, control channel reception and decoding is known to to be responsible for a significant proportion of the overall power budget. It is therefore highly advantageous to reduce receiver power consumption for the control channel use case. In this way, a low-power scouting receiver may be beneficial in reducing overall power consumption leading to longer battery life for the user.

II. Jamming Detection

Figure 9:
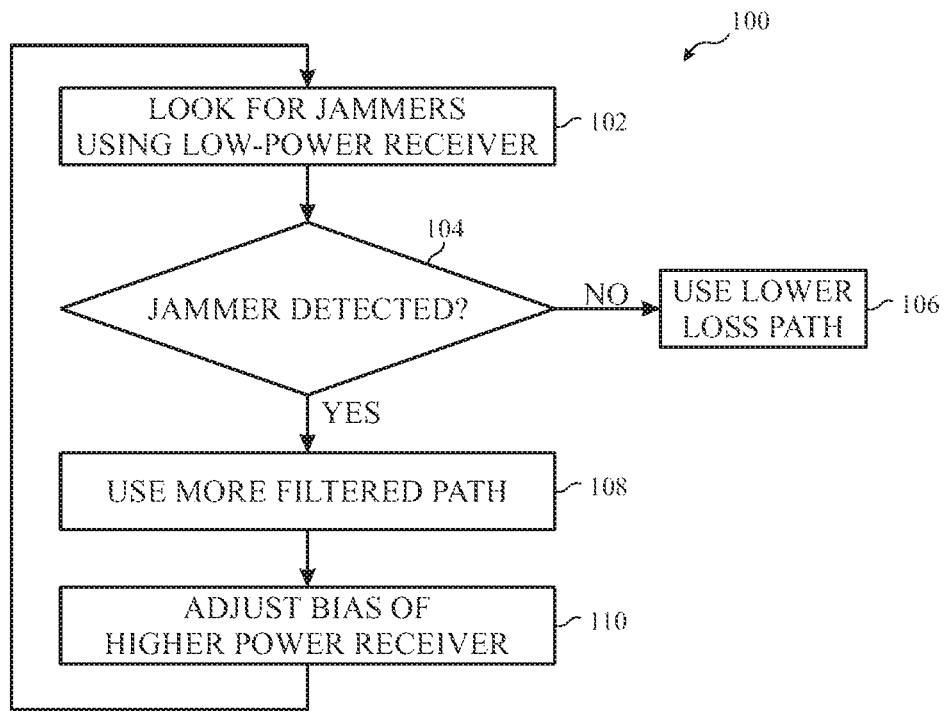
FIG. 9 illustrates a flow diagram of a process for jammer detection using the receiver system of FIG. 7, according to an embodiment.

The low-power receiver may be also used to detect in band or out of band receiver jammers. Awareness of jammer frequencies and relative levels can then be used for making decisions about configuration of normal receiver paths. FIG. 9 illustrates a process 100 for using a low-power receiver to scan for jammers and operating in response to such scans. the low-power receiver may be configured to detect jammers (block 102). Receiver logic then determines whether any jammers are detected (block 104). In an absence of jammers and based on this information the modem may configure the normal receiver path in the RF front end to a lower loss (e.g., filter-less or relaxed filtering path) when receiving traffic channels (block 106). The selected lower loss improves the overall receiver noise floor translating to improved SNR and a higher quality radio link. Improvements in the radio link causes higher throughput and better edge of cell coverage. In other words, such operation increases connection fidelity. If jammers are detected, a more filtered path may be used (block 108). Additionally or alternatively, awareness of jammers determined by the low-power receiver may be used to adjust the operating point (bias) of the normal receiver as another means of optimizing current consumption dependent radio conditions (block 110).

III. Self-Interference Detection

Figure 10:
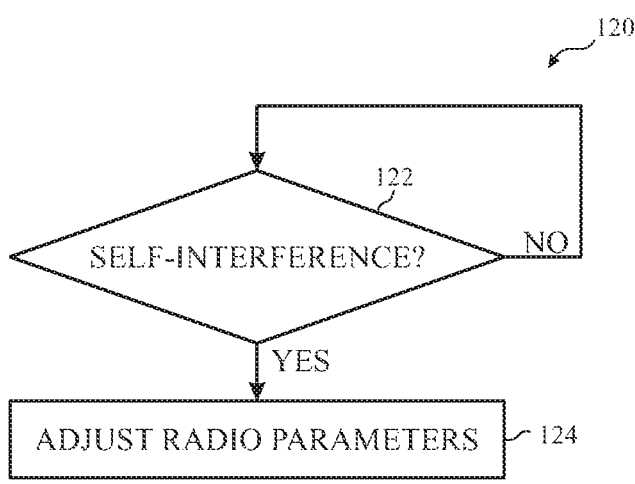
FIG. 10 illustrates a flow diagram of a process for self-interference detection using the receiver system of FIG. 7, according to an embodiment

The low-power receiver may also be used for detecting and demodulating system generated interference. Self-interference may be generated by other radio subsystems that are operated concurrent with the currently used radio. FIG. 10 illustrates a process 120 for using a low-power receiver for self-interference detection. For example, wireless local area network (WLAN) radios may interfere with cellular radio signals. The low-power receiver is used to determine whether self-interference signals are occurring (block 122). When these interfering signals are detected, operation of the radio is adjusted accordingly (block 124). For example, awareness of the interference may then be used as an input to algorithms running on system processors, which are tasked with managing concurrent radio resources. In some embodiments, demodulated interference from the low-power receiver may be used for cancelling the destructive signal in either the frequency domain or the digital domain. Each of these operating techniques provides a more robust radio link for use cases where multiple radios are operated concurrently.

IV. Feedback Receiver

The electronic device 10 may include a feedback receiver (FBRX). For example, LTE multi-mode radio frequency transceivers for Cellular UE applications typically include a dedicated feedback receiver (FBRX) for monitoring the forward transmission signal in order to maintain a constant transmit power. The FBRX is integral to closed loop transmission power control. In certain modes the FBRX may also be used to monitor the reverse transmission signal in order to make an approximation of the antenna voltage standing wave ratio (VSWR) condition.

The FBRX may be broadband to cover the supported bands and associated frequency ranges for the wireless technology included therein. Due to limited radio frequency requirements, the FBRX may use very low current operation and may be duty cycled to further reduce impacts on battery drain. In operation, the FBRX may be active during the beginning of the transmission slot and then deactivated once a corrected transmit power is achieved. Similarly, the FBRX may make periodic measurements of the reverse transmission signal to calculate antenna VSWR.

Given that the FBRX is not used continuously, there may be certain scenarios where the idle periods of the FBRX may be reused for scouting purposes as a low-power receiver, as discussed herein including receiver control, jamming detection, and/or self-interference detection.

Figure 11:
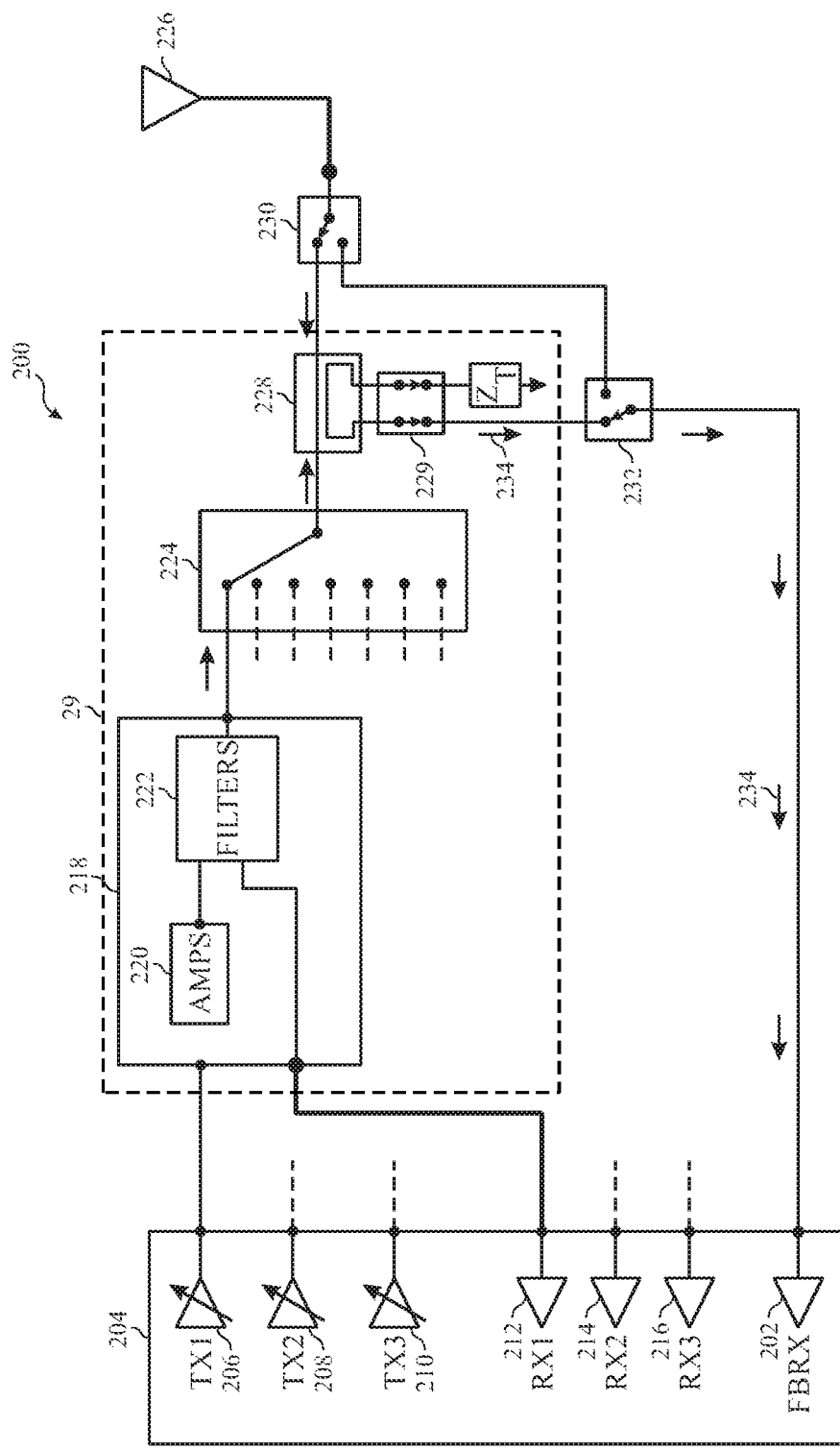
FIG. 11 illustrates a schematic view of a receiver system using a first path in a feedback receiver mode, according to an embodiment.

FIG. 11 illustrates an embodiment of a receiver system 200 that may be included in the electronic device 10 and may include a feedback receiver 202 in a transceiver array 204. The transceiver array 204 may include a CMOS radio frequency transceiver including multiple transmitters 206, 208, and 210 along with multiple receivers 212, 214, and 216. The transceiver array 204 includes receiver logic that controls the receiver functions. In some embodiments, the receiver logic may be embodied as hardware, software, or a combination thereof. For example, a portion of the receiver control may be offloaded to one or more of the processors 12. The transceiver array 204 interfaces with several front-end modules 218 though only one is shown for simplicity and brevity. The front-end modules 218 include amplifiers 220 and filters 222 for amplifying and/or filtering incoming or outgoing messages. For example, the filters 222 may include a duplex filter. In some embodiments, the front-end module 218 is configured to support multiple radio frequency bands per module. In other words, the filters 222 may allow more than a single band through.

The front-end module 218 is coupled to an antenna switch module 224 that multiplexes supported bands to an antenna 226. The receiver system 200 may also include a directional coupler 228 that controls what percentage of a signal received at the antenna 226 is sent to the feedback receiver 202. The directional coupler 228 may be configurable using a double-pole, double-throw switch 229. Moreover, the directional coupler 228 may be configured to support transmission forward path measurement for transmission power control and transmission reverse path measurement for monitoring VSWR condition. During forward path measurement, the directional coupler 228 siphons off a portion of the power and sends it back to the feedback receiver 202 where the proportion of power siphoned off is known. The feedback receiver 202 may demodulate to get amplitude and phase, but the feedback receiver 202 may have lower requirements and generally consume less power than other receivers in the transceiver array 204 even when the feedback receiver 202 demodulation is used.

Figure 12:
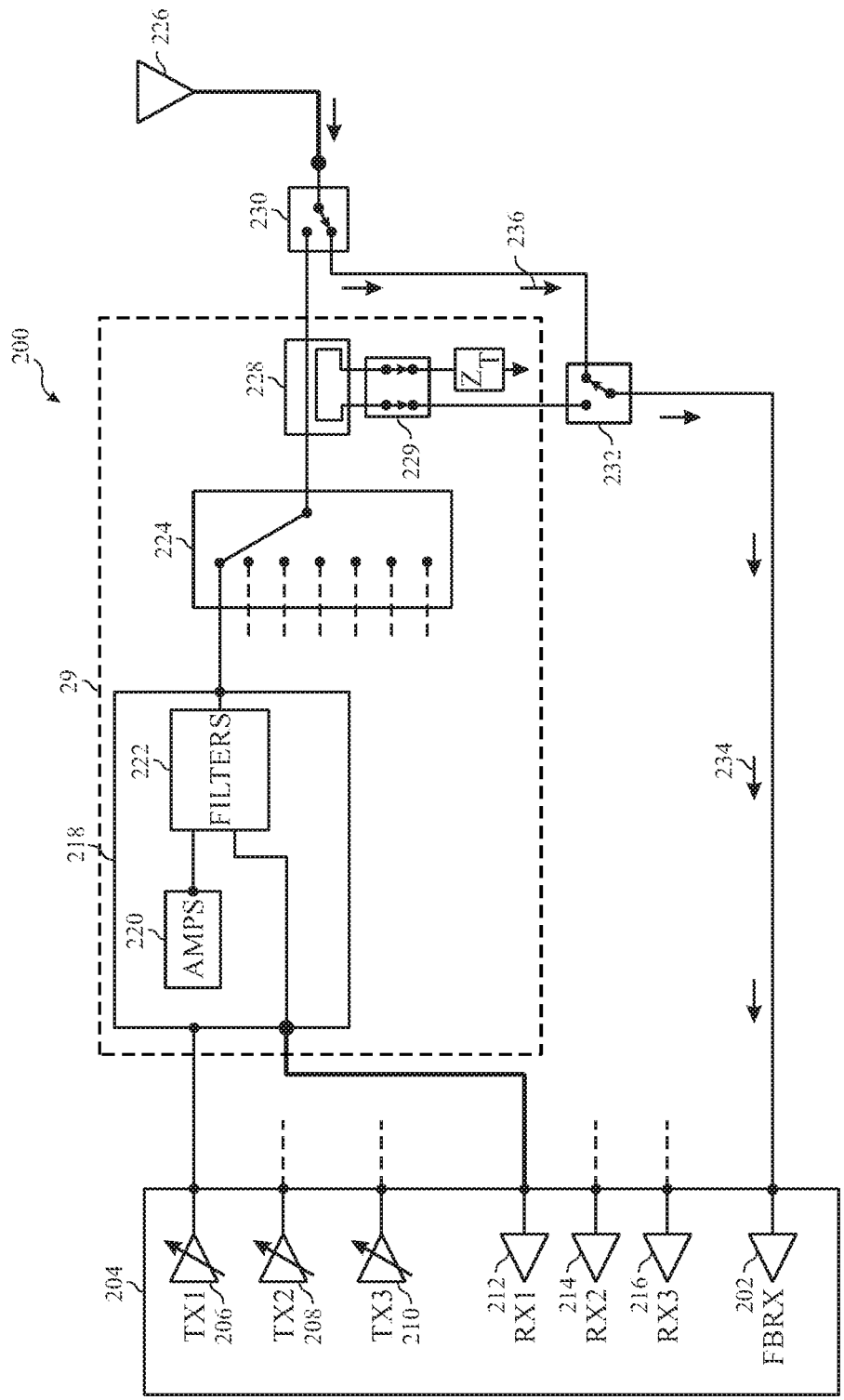
FIG. 12 illustrates a schematic view of the receiver system of FIG. 11 using a second path in a scouting mode, according to an embodiment.

The receiver system 200 may also include switches 230 and 232 that control which route is used to route a signal from the antenna 226 to the feedback receiver 202. The switches 230 and 232 may include single-pole, two-throw switches that support two paths. A first path 234 is used when the feedback receiver 202 is used in a feedback-sensing mode. Furthermore, since the signal is tapped off close to the antenna 226, loss may be low when passed directly to the feedback receiver 202. A second path 236, as illustrated in FIG. 12, may be used when the feedback receiver 202 is used in a scouting mode.

Figure 13:
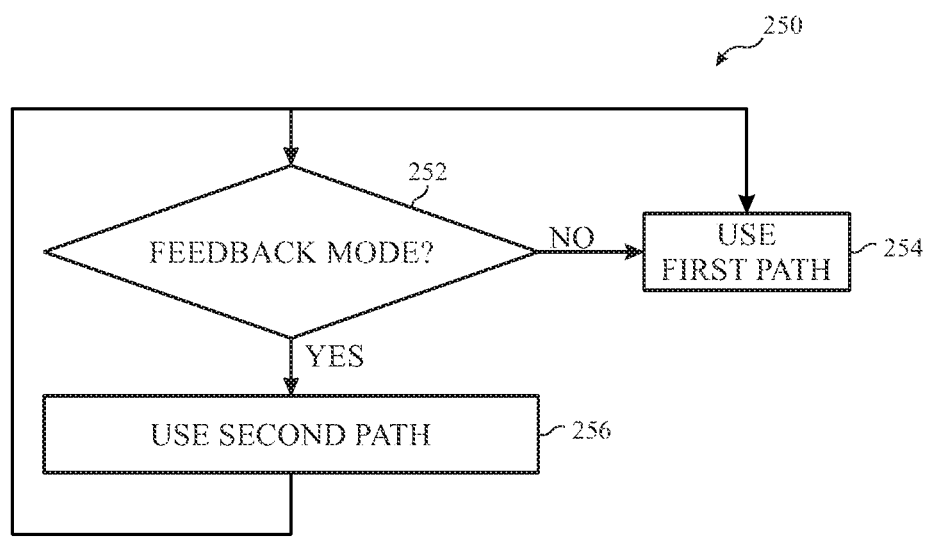
FIG. 13 illustrates a flow diagram of a process for using the receiver system of FIGS. 11 and 12 to selectively operate in the feedback receiver mode or the scouting mode, according to an embodiment.

FIG. 13 illustrates a process 250 for operating the receiver system 200 in a feedback mode and a scouting mode. The process 250 begins by determining whether the transceiver array 204 is transmitting with the feedback receiver to be active in a feedback mode (block 252). For example, if the transceiver array 204 is transmitting, determine whether the transmission has passed the beginning of a transmission slot where a corrected transmit power been achieved using the feedback receiver 202. Additionally or alternatively, is a periodic measurement from the feedback receiver is to take place. If feedback receiver 202 is to be active, connect the feedback receiver to the antenna 226 using a first path (block 254). For example, during the feedback mode toggle switches 230 and 232 to connect the feedback receiver to the antenna 27 via the directional coupler 228 in the path 234 illustrated in FIG. 11. However, if the feedback receiver is not to be operated in the feedback mode, place the feedback receiver 202 in a scouting mode (block 256). For example, during the scouting mode switches 230 and 232 are toggled to connect the feedback receiver to the antenna 27 bypassing the directional coupler 228 in the path 236 illustrated in FIG. 12. Furthermore, the scouting mode may be used to enable receiver control, jammer detection, and/or self-interference detection, as previously discussed. Furthermore, the feedback receiver 202 may be used for various other scouting functions, such as neighbor cell measurements, radio condition, and/or other radio context information to help the electronic device 10 set itself into a mode of operation specific to the radio context around the electronic device 10.

It may be understood that the foregoing processes may be embodied using hardware, software, or some combination thereof. For example, at least a portion of the steps may be performed using a processor to perform instructions stored in memory that are configured to cause the processor to perform the portions of the foregoing discussed processes, when executed. For example, the switching and signal processing may be performed at least partially using software, hardware, or a combination thereof.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
an antenna configured to receive a wireless signal;

a first receiver configured to receive and decode signals from the antenna, wherein the first receiver defaults to an inactive mode;

a second receiver configured to receive signals from the antenna, wherein the second receiver consumes relatively lower power than the first receiver when both receivers are in an active mode, wherein the second receiver is configured to receive the signals from the antenna, and the second receiver is configured to monitor a transmission of the electronic device when the second receiver is in a feedback mode; and receiver logic configured to, when in a scouting mode:
   determine whether the signals indicate whether substantive data is to be received by the first receiver; and
   awaken the first receiver when the signal includes an indication of substantive data is included to be received by the first receiver.

2. The electronic device of claim 1, wherein the signals indicate whether substantive data is included to be received by the first receiver using a control channel message.

3. The electronic device of claim 2, wherein the first and second receivers are configured to receive messages via a cellular network.

4. The electronic device of claim 3, wherein the receiver logic is configured to determine, from the signals received by the second receiver, whether jamming signals coexist with the cellular network.

5. The electronic device of claim 4, wherein the receiver logic is configured to:
   place the first receiver in a first mode if no jamming signals coexist with signals received by the first receiver; and
   place the first receiver in a second mode if jamming signals coexist with the signals received by the first receiver.

6. The electronic device of claim 4, wherein the receiver logic is configured to determine that the jamming signals comprise wireless signals out-of-band for the cellular network or corresponding to another wireless network type.

7. The electronic device of claim 6, wherein the other wireless network type comprises a wireless local area network.

8. The electronic device of claim 3, wherein the cellular network comprises a long-term evolution (LTE) network.

9. The electronic device of claim 8, wherein the control channel message comprises a Physical Downlink Control Channel (PDCCH) message indicative of whether data is being or is to be transmitted over a Physical Downlink Shared Channel (PDSCH).

10. The electronic device of claim 9, wherein the receiver logic comprises circuitry, a processor, or a combination thereof.

11. A tangible, non-transitory, computer-readable medium storing instructions thereon, wherein the instructions are configured to cause a processor, when executed, to:
   in a feedback mode, utilize a feedback receiver to monitor forward transmissions for at least a portion of a transmission;
   in a scouting mode:
     determine whether a signal received via the feedback receiver indicates whether substantive data is to be received by a receiver of a transceiver array based on the signal received via the feedback receiver; and
     awaken the receiver when the signal received via the feedback receiver includes an indication that substantive data is included to be received by the receiver.

12. The non-transitory, computer-readable medium of claim 11, wherein the instructions are configured to cause the processor to:
   determine whether self-interference is occurring based on the signal received via the feedback receiver; and
   if interfering signals are detected in the signal received via the feedback receiver, adjust operation of the receiver.

13. The non-transitory, computer-readable medium of claim 12, wherein adjusting operation comprises:
   demodulating the signals received via the feedback receiver;
   generating a cancellation signal to cancel the self-interference; and
   at least partially cancelling the self-interference using the cancellation signal.

\* \* \* \* \*

UNITED STATES PATENT AND TRADEMARK OFFICE
CERTIFICATE OF CORRECTION

PATENT NO.         : 10,003,366 B2
APPLICATION NO.    : 15/241802
DATED              : June 19, 2018
INVENTOR(S)        : Ronald W. Dimpflmaier et al.

Page 1 of 1

It is certified that error appears in the above-identified patent and that said Letters Patent is hereby corrected as shown below:

In the Claims

Column 12, Line 35 (Claim 13) - replace "signals" with --signal--.

Signed and Sealed this
Eleventh Day of December, 2018

Andrei Iancu
*Director of the United States Patent and Trademark Office*